US012641408B2

(12) United States Patent
Henry et al.

(10) Patent No.: US 12,641,408 B2
(45) Date of Patent: May 26, 2026

(54) ROAMING VALIDATION METHOD FOR ACCESS NETWORK PROVIDERS

(71) Applicant: Cisco Technology, Inc., San Jose, CA (US)

(72) Inventors: Jerome Henry, Pittsboro, NC (US); Robert E. Barton, British Columbia (CA); Vinay Saini, Karnatka (IN); Bart A. Brinckman, Nevele (BE); Mark Grayson, Berkshire (GB)

(73) Assignee: Cisco Technology, Inc., San Jose, CA (US)

( * ) Notice: Subject to any disclaimer, the term of this patent is extended or adjusted under 35 U.S.C. 154(b) by 410 days.

(21) Appl. No.: 17/933,527

(22) Filed: Sep. 20, 2022

(65) Prior Publication Data

US 2024/0098477 A1 Mar. 21, 2024

(51) Int. Cl.
| | |
|---|---|
| *H04W 8/08* | (2009.01) |
| *H04W 8/06* | (2009.01) |
| *H04W 76/18* | (2018.01) |

(52) U.S. Cl.
CPC ............... *H04W 8/08* (2013.01); *H04W 8/06* (2013.01); *H04W 76/18* (2018.02)

(58) Field of Classification Search
CPC ......... H04W 8/08; H04W 8/06; H04W 76/18; H04W 84/12; H04W 12/069; H04L 63/0815; H04L 63/0823
See application file for complete search history.

(56) References Cited

U.S. PATENT DOCUMENTS

| | | | |
|---|---|---|---|
| 12,137,176 B1 * | 11/2024 | Wan | H04L 9/3247 |
| 2007/0110036 A1 * | 5/2007 | Lang | H04M 7/0036 |
| | | | 370/352 |
| 2015/0347738 A1 * | 12/2015 | Ulrich | G06F 21/34 |
| | | | 726/17 |
| 2017/0359332 A1 | 12/2017 | Hanay et al. | |
| 2018/0310191 A1 * | 10/2018 | Kloper | H04W 24/08 |
| 2020/0092295 A1 * | 3/2020 | Hartley | H04L 63/0254 |
| 2021/0282014 A1 | 9/2021 | Johnston et al. | |
| 2022/0124167 A1 | 4/2022 | Canpolat et al. | |

(Continued)

FOREIGN PATENT DOCUMENTS

| | | |
|---|---|---|
| WO | 2022/082024 A1 | 4/2022 |

OTHER PUBLICATIONS

Canpolat et al "OpenRoaming: One Global Network of Wi-Fi Networks" (Year: 2021).*

(Continued)

*Primary Examiner* — Sun Jong Kim
(74) *Attorney, Agent, or Firm* — Merchant & Gould P.C.

(57) ABSTRACT

Roaming validation for Access Network Providers (ANPs), and particularly to protecting communications between Stations (STAs) and ANPs while providing roaming validation for ANPs may be provided. An ANP may first register a roaming federation system. The ANP may determine a roaming message based on subscription features of the network, and the ANP may request signing of the roaming message by the roaming federation system. The ANP may receive the signed roaming message from the roaming federation system and send the signed roaming message to a STA. The ANP may then receive a request to connect to the network from the STA and initiate a connection for the STA.

20 Claims, 4 Drawing Sheets

(56)                    References Cited

U.S. PATENT DOCUMENTS

| | | |
|---|---|---|
| 2022/0131853 A1 | 4/2022 | Smith et al. |
| 2023/0073938 A1* | 3/2023 | Robinson-Morgan ....................... H04L 9/321 |
| 2023/0164554 A1* | 5/2023 | Canpolat .............. H04W 12/30 726/7 |

OTHER PUBLICATIONS

Notification of Transmittal of The International Searching Report and the Written Opinion issued in International Patent Application No. PCT/US2023/074586 mailed Dec. 11, 2023 (19 pages).
Anonymous: "White Paper OpenRoaming: One Global Network of Wi-Fi Networks":, Retrieved from the Internet: URL:https://web.archive.org/web/20211011121302if_/https://www.intel.com/content/dam/www/central-libraries/us/en/documents/wi-fi-open-roaming-overview-whitepaper.pdf [retrieved on Feb. 11, 2022].

* cited by examiner

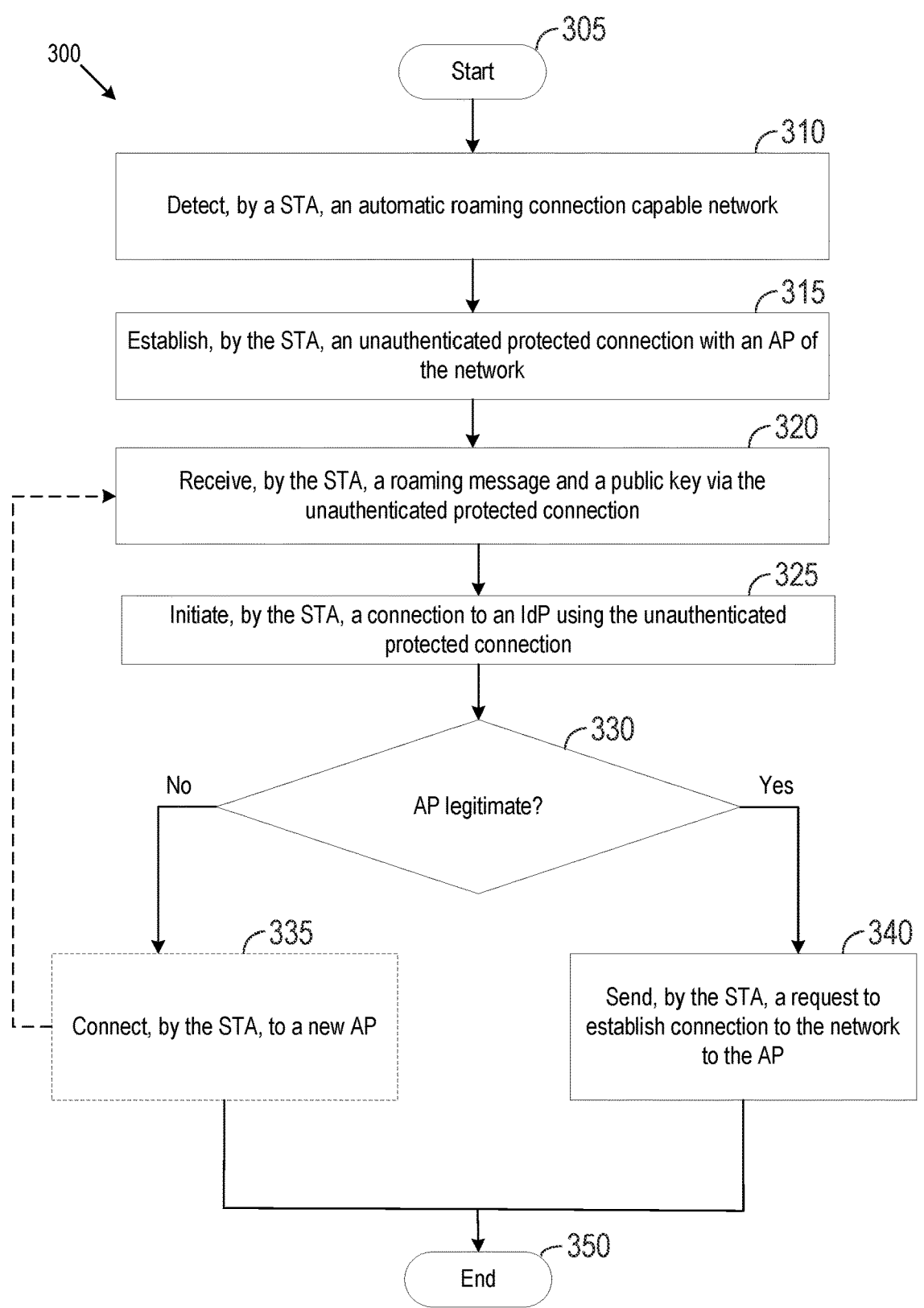

300

305
Start

310
Detect, by a STA, an automatic roaming connection capable network

315
Establish, by the STA, an unauthenticated protected connection with an AP of the network 320
Receive, by the STA, a roaming message and a public key via the unauthenticated protected connection 325
Initiate, by the STA, a connection to an IdP using the unauthenticated protected connection 330
AP legitimate?

No          Yes

335
Connect, by the STA, to a new AP

340
Send, by the STA, a request to establish connection to the network to the AP 350
End

*Fig. 3*

ROAMING VALIDATION METHOD FOR ACCESS NETWORK PROVIDERS

TECHNICAL FIELD

The present disclosure relates generally to providing roaming validation for Access Network Providers (ANPs), and particularly to protecting communications between Stations (STAs) and ANPs while providing roaming validation for ANPs.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings:

FIG. 3 is a flow chart of a method for providing roaming validation for ANPs using an unauthenticated protected connection.

DETAILED DESCRIPTION

Overview

Figure 1:
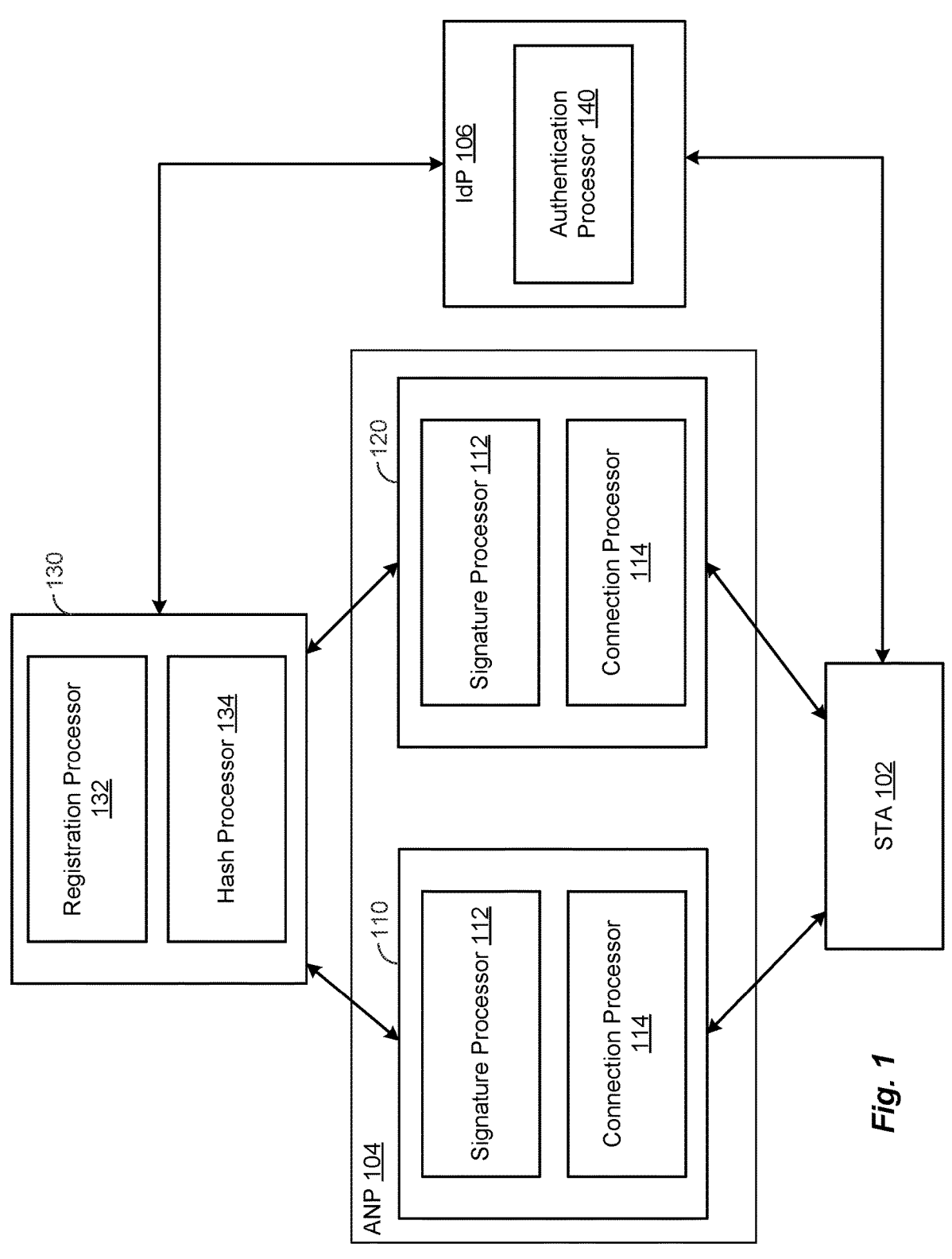
FIG. 1 is a block diagram of an operating environment for providing roaming validation for Access Network Providers (ANPs)

Roaming validation for Access Network Providers (ANPs), and particularly to protecting communications between Stations (STAs) and ANPs while providing roaming validation for ANPs may be provided. An ANP may first register a roaming federation system. The ANP may determine a roaming message based on subscription features of the network, and the ANP may request signing of the roaming message by the roaming federation system. The ANP may receive the signed roaming message from the roaming federation system and send the signed roaming message to a STA. The ANP may then receive a request to connect to the network from the STA and initiate a connection for the STA.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Traditionally, when a user connects to a Wi-Fi network, the user may need to manually select a network, enter a password to connect to the selected network if it is a secured network, enter credentials, and the like. A framework to improve the Wi-Fi connection process has been introduced. The framework allows users to connect or onboard to Wi-Fi networks seamlessly and securely without performing manual processes by linking Access Network Providers (ANP) (e.g., public venues, retailers, airports, enterprises) and Identity Providers (IdPs) (e.g., service provider carriers, devices, cloud partners). Therefore, a user may automatically connect to Wi-Fi networks when traveling to different locations.

A user may initially sign in with a trusted entity provider and then automatically connect to Wi-Fi networks utilizing the framework whenever and wherever the networks are available. The framework may also allow the users to transition between cellular (e.g., a Fifth Generation (5G) network) and Wi-Fi networks.

The framework for auto-onboarding has been increasingly utilized. The auto-onboarding may be referred to as an automatic roaming connection process. The rapid growth in utilization has led to increasing complexity of executing the framework. For example, ANPs may all have different IdPs that the ANPs wish allow credentials from while excluding other IdPs. Additionally, ANPs may provide Service-Level Agreements (SLA) to some users, may reserve networks for specific types of users, and the like.

The framework may leverage a Roaming Consortium Organization Identifier (RCOI) to allow a client, an ANP, and an IdP to perform the automatic connection process. For example, the STA may determine if the ANP is suitable for connecting to using the RCOI, because the RCOI may identity if the network is associated with an ANP the STA is authorized to connect to. The STA may receive the RCOI via communications with an Access Point (AP) associated with the ANP.

The RCOI may also identify additional options and conditions such as the Quality of Service (QoS). Additional options and conditions may also need to be exchanged between a Station (STA) associated with the client and the ANP via communications between the STA and ANP (e.g., via APs of the ANP). However, the RCOI and other information in a communication or beacon to a STA may not be authenticated, and entities may spoof or forge beacons. Furthermore, an exchange of options between STAs and ANPs (e.g., via the APs of the ANP) is commonly performed using Access Network Query Protocol Server (ANQP) pre-association messages that are also not authenticated. Thus, communications between STAs and ANPs may need to be protected during connection processes provided by the framework to prevent disruptions, quality degradation, and other problems with executing the framework to automatically connect to Wi-Fi networks.

FIG. 1 is a block diagram of an operating environment 100 for providing roaming validation for ANPs. The operating environment 100 includes an STA 102, an ANP 104, an IdP 106, and a roaming federation system 130. The STA 102 may be any client device that may connect to a network associated with the ANP 104. The ANP 104 may be a Wi-Fi access provider that includes any number of APs, including an AP 110 and an AP 120. The IdP 106 may be the cellular network provider of the STA 102. A roaming federation and the roaming federation system 130 may link service providers (e.g., the ANP 104), IdPs (e.g., the IdP 106), and clients (e.g., the STA 102) to share credentials and access networks.

The ANP 104 and/or the IdP 106 may both register with the roaming federation by sending a request to the roaming federation system 130. When the ANP 104 and the IdP 106 are registered with the roaming federation, the ANP 104 and the IdP 106 may be able provide automatic roaming connection services to clients, such as the STA 102. Once the roaming federation system 130 receives a request from the ANP 104 and/or the IdP 106, the roaming federation system 130, via the registration processor 132, may process the one or more requests to register the ANP 104 and/or the IdP 106 with the roaming federation.

The ANP 104 may broadcast messages or send responses to probes that indicate the subscription features of the ANP 104 for STAs attempting to perform an automatic roaming connection process. The messages or responses may include a Roaming Consortium Organization Identifier (RCOI). The RCOI may express one or more of the subscription features of the ANP 104. The subscription features of the ANP 104 may be any feature of the network overall, the network at the location of the STA 102, the APs overall, the APs at the location of the network (e.g., the AP 110 and the AP 120), and the like. For example, the elements may include the Quality of Service (QoS), the network providers the ANP 104 may connect with, the requirements of STAs connecting to the ANP 104, and the like. The STA 102 may determine whether to complete the automatic roaming connection process after reviewing the subscription features of the ANP 104. The STA 102 may also communicate with the IdP 106 to authenticate the ANP 104, such as via the authentication processor 140.

ANP-STA Communication Security Using Digital Signatures

Once the ANP 104 and/or the IdP 106 are registered, roaming federation system 130 may send the ANP 104 and/or the IdP 106 a public key and a private key. The ANP 104 may then create and send, via the signature processors 112, one or more roaming messages to the roaming federation system 130 to be signed. The roaming messages may be beacons, probe responses, ANQP responses for each auto-mated roaming enabled Service Set Identifiers (SSIDs), and the like. The roaming messages may be messages, such as Service-Level Agreements (SLAs) and SSIDs, that detail the subscription features of the network of the ANP 104.

Each Per Provider Subscription Management Object (PPS MO) subscription on a STA, such as the STA 102, may include a public key, such as a SSID validation or public key. The public key may be the public key the IdP 106 receives from the roaming federation system 130. For example, the roaming federation system 130 may provide a SSID public key to the IdP 106, and the IdP 106 may then provide the SSID public key to the STA 102. Each PPS MO may include options or subscription features that the STA 102 may check before attempting the automatic roaming connection process using the subscription associated with the PPS MO. For example, the STA 102 may determine that a connection is not possible based on the options and features a network has and does not have. The STA 102 and/or the STA's 102 subscriptions (e.g., the STA 102 subscription to the IdP 106) may not be compatible with the network for example.

When the roaming federation system 130 receives a message, the roaming federation system 130 may sign, via the hash processor 134, the message using the private key provided to the ANP 104. The signature may be a hashed signature. The roaming federation system 130 may then send the signed message to the ANP 104. The ANP 104 may store the encrypted messages in the signature processors 112.

The messages may include a timestamp and only be valid for a period of time (e.g., daily, weekly, monthly). The ANP 104 may send new messages periodically with updated timestamps to hashed or otherwise encrypted and discard the invalid messages. The roaming federation system 130 may send requests to the ANP 104 to sign messages with new timestamps periodically. The STA 102 may evaluate the timestamps to determine if messages received from the ANP 104 are still valid.

When the STA 102 communicates with the ANP 104, via the connection processors 114 of the AP 110 or the AP 120 for example, the ANP 104 may send one of the encrypted messages to the STA 102. For example, if the STA 102 is communicating with the AP 110, the AP 110 may send an encrypted message to the STA 102. The STA 102 may use the correct PPS MO configured public key to validate the message, using the signature for example. For example, the PPS MO configured public key may be the public key the ANP 104 received from the roaming federation system 130.

If the STA 102 determines the message is valid, the STA 102 may proceed with the automatic roaming connection process with the ANP 104. If the STA 102 determines the message is not valid, the STA 102 may determine not to connect to the ANP 104 or attempt to communicate with another AP. For example, if the invalid message was sent by the AP 110 or a malicious system that is attempting to appear as the AP 110, the STA may attempt to communicate with the AP 120.

ANP-STA Communication Security Using Unauthenticated Protected Connections

When the STA 102 detects an automatic roaming connection capable network, such as the network of the ANP 104, the STA 102 may establish an unauthenticated protected connection with an AP of the network, for example the AP 110. While the communications between the STA 102 and the ANP 104 may be described as occurring between the STA 102 and the AP 110, the STA 102 may communicate with any AP of the ANP 104. The unauthenticated protected connection may be a connection that uses Opportunistic Wireless Encryption (OWE), Fast Transition OWE (FT-OWE), and the like.

Using the unauthenticated protected connection, the STA 102 may receive a message from the AP 110 including the subscription features, such as via an ANQP exchange. The STA 102 may send a probe to the AP 110 to receive the message, the AP 110 may send the message in response to the unauthenticated protected connection being established, and the like. The STA 102 may determine whether to connect to the network based on the subscription features, because the STA 102 and/or the associated subscriptions (e.g., the STA 102 subscription to the IdP 106) may make the STA 102 incompatible to, unauthorized to, or otherwise unable to connect to the network.

The messages sent by the AP 110 may be signed for validation by the STA 102. For example, the messages may be signed according to the description of ANP-STA communication security using digital signatures above. Therefore, the STA 102 may also receive a public key, such as from the AP 110, to validate the messages. The public key may be associated with a Wireless Local Area Network Controller (WLC), a Multifunction Peripheral (MFP), and the like.

Using the unauthenticated protected connection, the STA 102 may initiate a connection to the IdP 106. The connection may be an Extensible Authentication Protocol (EAP) connection. The STA 102 may initiate the connection to verify whether the ANP 104 is a legitimate network that can facilitate the connection between the STA 102 and the IdP 106.

When the STA 102 successfully connects to the IdP 106 using the unauthenticated protected connection, the STA 102 may determine that the AP 110 is legitimate and continue with the automatic roaming connection process to access the ANP's 104 network. The STA 102 may also establish a Preassociation Security Negotiation (PASN) connection to the AP 110 to receive additional ANQP options. The ANQP options may be signed, such as by the roaming federation system 130, and the STA 102 may validate the options according to the description of ANP-STA communication security using digital signatures above.

When the STA 102 does not successfully connect to the IdP 106 using the unauthenticated protected connection, the STA 102 may determine that the AP 110 is not legitimate. The STA 102 may attempt to connect to another AP of the ANP 104, such as the AP 120, to retry the unauthorized protection connection process described above again or determine not to proceed with connecting to the ANP 104.

Figure 2:
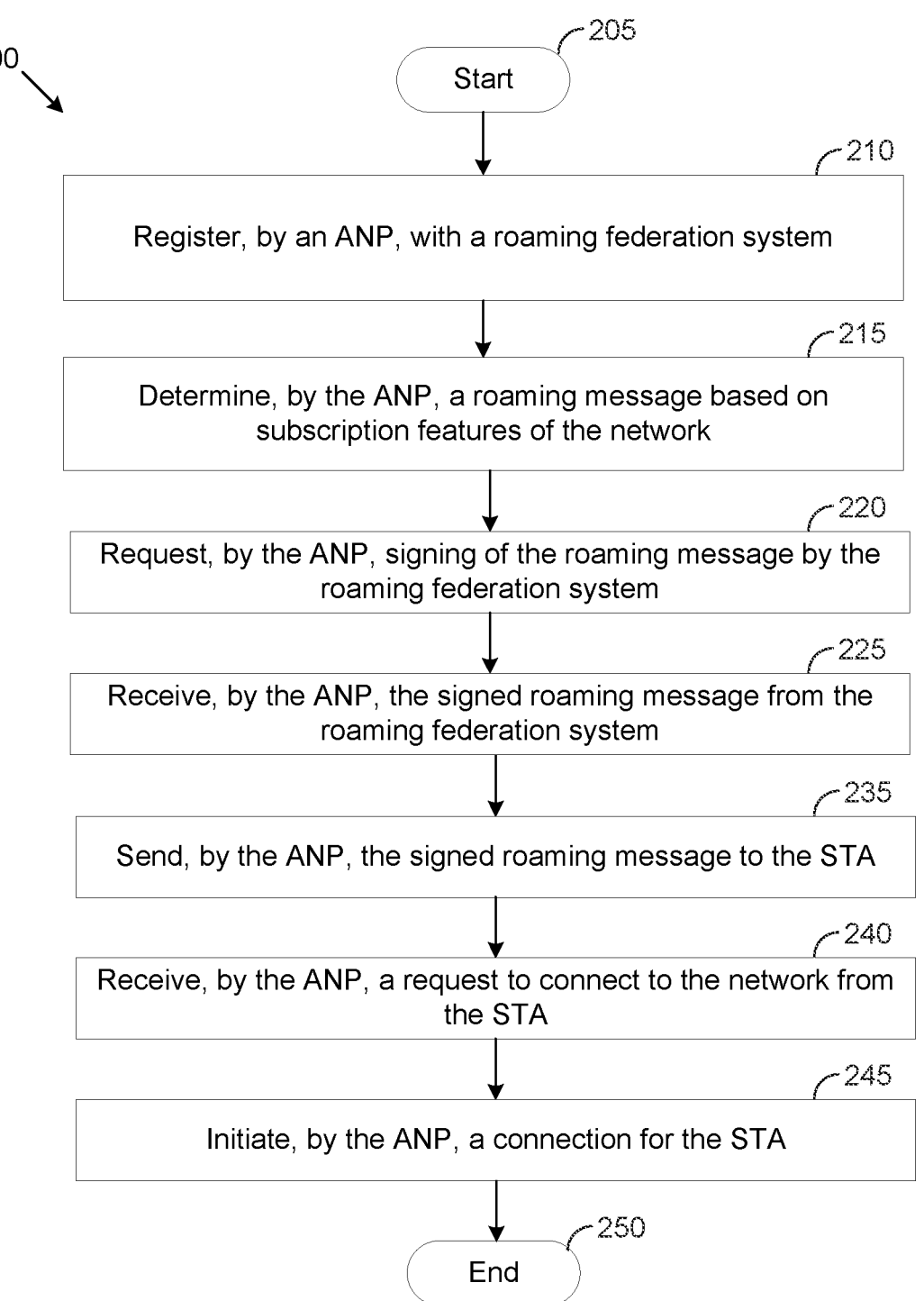
FIG. 2 is a flow chart of a method for providing roaming validation for ANPs using a digital signature.

FIG. 2 is a flow chart of a method 200 for providing roaming validation for ANPs using a digital signature. An ANP will be described as completing one or more of the operations of the method 200, and one or more APs of the ANP, such as the AP 110 and/or the AP 120, may complete one or more of the operations when the ANP is referred to. The method 200 may begin in starting block 205 and proceed to operation 210. In operation 210, an ANP registers with a roaming federation system. For example, the ANP 104 may send a request to register with the roaming federation system 130. The roaming federation system 130 may register the ANP 104 and send the ANP 104 a public key and a private key.

In operation 215, the ANP may determine a roaming message based on subscription features of the network associated with the ANP. For example, the ANP 104 may determine one or roaming messages to be sent to clients that want to determine the subscription features of the ANP's 104 network. The roaming message may be beacons, probe responses, ANQP responses for each automated roaming enabled SSID, and the like. The roaming messages may be messages, such as Service-Level Agreements (SLAs), that detail the subscription features of the network of the ANP 104. The roaming messages may be predetermined and pre-formatted for future messages as long as the subscription features do not change.

In operation 220, the ANP may request the roaming message to be signed by the roaming federation system. For example, the ANP 104 sends the roaming message to the roaming federation system 130 to be signed. In operation 225, the ANP may receive the signed roaming message. For example, ANP 104 receives the signed roaming message from the roaming federation system 130.

In operation 235, the ANP may send the signed roaming message to the STA. For example, the ANP 104 sends the signed roaming message in response to the STA 102 sending a roaming probe to the ANP 104 to attempt to initiate the automatic roaming connection process, the ANP 104 may be broadcasting the signed roaming message, or the ANP 104 may communicate with the STA 102 in some other way. In operation 240, the ANP may receive a request to connect to the network from the STA. For example, the ANP 104 may receive the request from the STA 102. Receiving the request may indicate that the STA 102 determined the subscription features were appropriate for connecting to and that the STA 102 successfully validated the signed roaming message. In operation 245, the ANP may initiate the connection for the STA. For example, the ANP 104 completes the automatic roaming connection process by initiating the STA's 102 connection to the network. The method 200 may conclude at ending block 250.

FIG. 3 is a flow chart of a method for providing roaming validation for ANPs using an unauthenticated protected connection. An ANP will be described as completing one or more of the operations of the method 300, and one or more APs of the ANP, such as the AP 110 and/or the AP 120, may complete one or more of the operations when the ANP is referred to. The method 300 may begin at starting block 305 and proceed to operation 310. In operation 310 a STA may detect an automatic roaming connection capable network. For example, the STA 102 may detect that the ANP 104 is providing an automatic roaming connection capable network by probing the ANP 104, receiving a broadcast message from the ANP 104, establishing a connection to the ANP 104, and the like.

In operation 315, the STA may establish an unauthenticated protected connection with an AP of the network. For example, the STA 102 may establish an unauthenticated protected connection, such as an OWE connection or a FT-OWE connection, with the AP 110 or the AP 120. In operation 320, the STA may receive a roaming message and a public key from the ANP 104. For example, the STA 102 may receive the roaming message and the public key from the AP 110 when the STA 102 establishes the unauthenticated protected connection with the AP 110 in operation 315. The roaming message may be signed, such as by the roaming federation system 130, and may include information about the subscription features. In examples, the STA 102 may validate the roaming message using the signature and the public key. The STA 102 may additionally determine whether the STA 102 can connect to the network based on the subscription features. The STA 102 may determine to proceed with the method 300 if roaming message is validated and/or the STA 102 can connect to the network based on the subscription features. The STA 102 may determine to not proceed with the method 300 if roaming message is not validated and/or the STA 102 cannot connect to the network based on the subscription features.

In operation 325, the STA may initiate a connection to an IdP using the unauthenticated protected connection. For example, the STA 102 may initiate the connection to the IdP 106 to using the unauthenticated protected connection to determine if the AP is part of a legitimate network that can facilitate the connection to the IdP 106. In operation 330, it is determined if the AP is legitimate. For example, if the connection to the IdP 106 initiated in operation 325 is successful, the STA may determine that the AP is legitimate. If the connection to the IdP 106 initiated in operation 325 is not successful, the STA may determine that the AP is not legitimate.

If the connection to the STA is determined to not be legitimate in operation 330, the method 300 may proceed to operation 335. In operation 335, the STA may connect to a new AP. For example, the STA may attempt to connect to another AP of the ANP 104, the AP 120 for example. The method may then proceed back to operation 320, for the unauthenticated protected connection process to be attempted with the new AP. Alternatively, the STA 102 may determine to not connect to the ANP 104 and proceed to ending block 350 from operation 330.

If the connection to the STA is determined to be legitimate in operation 330, the method 300 may proceed to operation 340. In operation 340, the STA may send a request to the AP to establish a connection to the network. For example, the STA 102 may send the request to the AP 110 to continue with the automatic roaming connection process. The method 300 may conclude at ending block 350.

Figure 4:
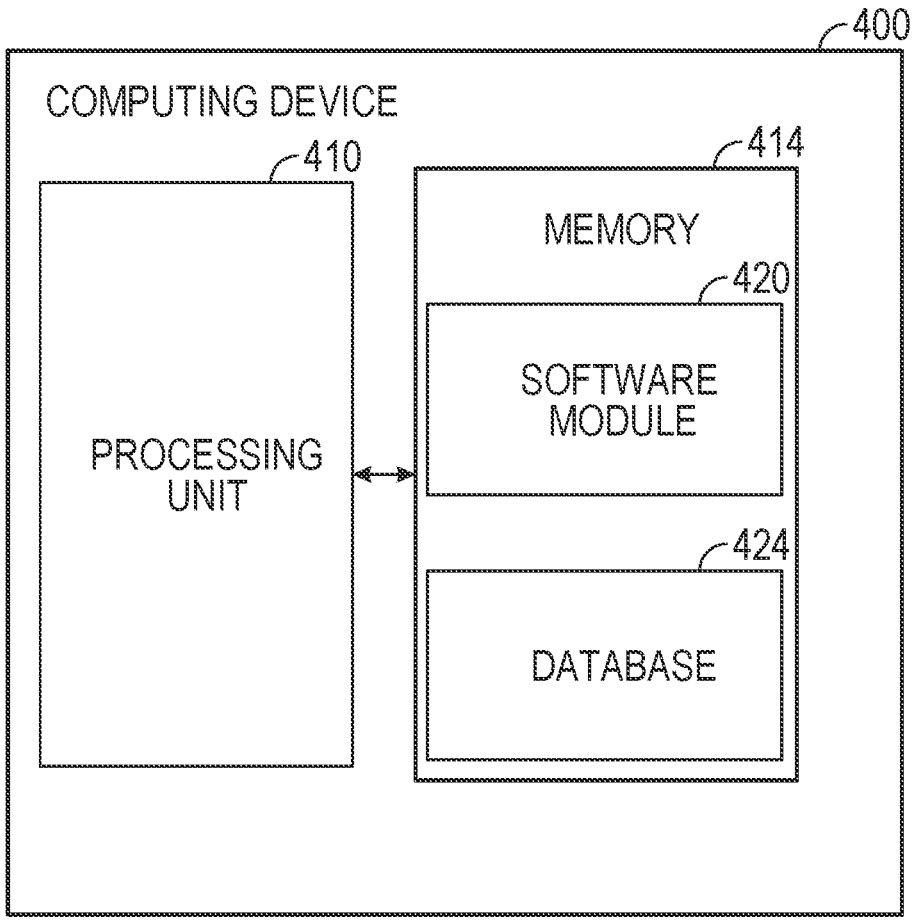
FIG. 4 is a block diagram of a computing device.

FIG. 4 is a block diagram of a computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing roaming validation for ANPs as described above with respect to FIG. 1, FIG. 2, and FIG. 3. Computing device 400, for example, may provide an operating environment for the STA 102, the ANP 104, the IdP 106, the AP 110, the AP 120, the roaming federation system 130, and/or any other system described herein. The STA 102, the ANP 104, the IdP 106, the AP 110, the AP 120, the roaming federation system 130, and/or any other system described herein may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
   registering, by an Access Network Provider (ANP), with a roaming federation system;
   determining, by the ANP, a roaming message based on subscription features of a network;
   requesting, by the ANP, signing of the roaming message by the roaming federation system;
   receiving, by the ANP, the signed roaming message from the roaming federation system;
   sending, by the ANP, the signed roaming message to a Station (STA);
   receiving, by the ANP, a request to connect to the network from the STA, wherein the STA stores a Per Provider Subscription Management Object (PPS MO) received from an Identity Provider (IdP), and wherein the PPS MO comprises subscription features that the STA checks, before sending the request to connect to the network, to attempt automatic roaming connection process with the ANP using the subscription features associated with the PPS MO; and
   initiating, by the ANP, a connection for the STA.

2. The method of claim 1, wherein receiving, by the ANP, the request to connect to the network from the STA is in response to the STA at least one of (i) validating, by the STA, the roaming message, (ii) evaluating, by the STA, subscription features included in the roaming message, or (iii) a combination of (i) and (ii).

3. The method of claim 2, wherein validating, by the STA, the roaming message comprises using a public key to validate a signature of the signed roaming message.

4. The method of claim 3, further comprising receiving, by the STA, the public key from the IdP.

5. The method of claim 1, wherein sending, by the ANP, the signed roaming message to the STA is in response to receiving a roaming probe from the STA.

6. The method of claim 1, wherein the signed roaming message includes a timestamp indicating a period when the signed roaming message is valid.

7. The method of claim 6, further comprising determining, by the STA, whether the signed roaming message is still valid by evaluating the timestamp.

8. The method of claim 1, further comprising establishing an unauthenticated protected connection between the ANP and the STA, wherein sending, by the ANP, the signed roaming message to the STA comprises sending the signed roaming message via the unauthenticated protected connection.

9. A non-transitory computer-readable medium that stores a set of instructions which, when executed by a processor, perform a method executed by the set of instructions comprising:
   registering, by an Access Network Provider (ANP), with a roaming federation system;
   determining, by the ANP, a roaming message based on subscription features of a network;
   requesting, by the ANP, signing of the roaming message by the roaming federation system;
   receiving, by the ANP, the signed roaming message from the roaming federation system;
   sending, by the ANP, the signed roaming message to a Station (STA);
   receiving, by the ANP, a request to connect to the network from the STA, wherein the STA stores a Per Provider Subscription Management Object (PPS MO) received from an Identity Provider (IdP), and wherein the PPS MO comprises subscription features that the STA checks, before sending the request to connect to the network, to attempt automatic roaming connection process with the ANP using the subscription features associated with the PPS MO; and
   initiating, by the ANP, a connection for the STA.

10. The non-transitory computer-readable medium of claim 9, wherein receiving, by the ANP, the request to connect to the network from the STA is in response to the STA at least one of (i) validating, by the STA, the roaming message, (ii) evaluating, by the STA, subscription features included in the roaming message, or (iii) a combination of (i) and (ii).

11. The non-transitory computer-readable medium of claim 10, wherein validating, by the STA, the roaming message comprises using a public key to validate a signature of the signed roaming message.

12. The non-transitory computer-readable medium of claim 11, further comprising receiving, by the STA, the public key from the IdP.

13. The non-transitory computer-readable medium of claim 9, wherein sending, by the ANP, the signed roaming message to the STA is in response to receiving a roaming probe from the STA.

14. The non-transitory computer-readable medium of claim 9, wherein the signed roaming message includes a timestamp indicating a period when the signed roaming message is valid.

15. The non-transitory computer-readable medium of claim 14, further comprising determining, by the STA, whether the signed roaming message is still valid by evaluating the timestamp.

16. The non-transitory computer-readable medium of claim 9, further comprising establishing an unauthenticated protected connection between the ANP and the STA, wherein sending, by the ANP, the signed roaming message to the STA comprises sending the signed roaming message via the unauthenticated protected connection.

17. A system comprising:
   a memory storage; and
   a processing unit coupled to the memory storage, wherein the processing unit is operative to:
      register, by an Access Network Provider (ANP), with a roaming federation system;
      determine, by the ANP, a roaming message based on subscription features of a network;

request, by the ANP, signing of the roaming message by the roaming federation system;

receive, by the ANP, the signed roaming message from the roaming federation system;

send, by the ANP, the signed roaming message to a Station (STA);

receive, by the ANP, a request to connect to the network from the STA, wherein the STA stores a Per Provider Subscription Management Object (PPS MO) received from an Identity Provider (IdP), and wherein the PPS MO comprises subscription features that the STA checks, before sending the request to connect to the network; and initiate, by the ANP, a connection for the STA to attempt automatic roaming connection process with the ANP using the subscription features associated with the PPS MO.

18. The system of claim 17, wherein the request to connect to the network from the STA is received in response to the STA at least one of (i) validating, by the STA, the roaming message, (ii) evaluating, by the STA, subscription features included in the roaming message, or (iii) a combination of (i) and (ii).

19. The system of claim 17, wherein the roaming message is validated using a public key to validate a signature of the signed roaming message.

20. The system of claim 19, wherein the processing unit is further operative to receive the public key from the IdP.

* * * * *